(12) United States Patent
Grover et al.

(10) Patent No.: US 10,975,713 B2
(45) Date of Patent: Apr. 13, 2021

(54) HYDROSTATIC SEAL WITH AFT TOOTH

(71) Applicant: United Technologies Corporation, Farmington, CT (US)

(72) Inventors: Eric A. Grover, Tolland, CT (US); Brian F. Hilbert, Coventry, CT (US); Nathan L. Messersmith, South Windsor, CT (US); Christopher W. Robak, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 74 days.

(21) Appl. No.: 16/239,616

(22) Filed: Jan. 4, 2019

(65) Prior Publication Data

US 2020/0217216 A1    Jul. 9, 2020

(51) Int. Cl.
| | | |
|---|---|---|
| *F01D 11/02* | (2006.01) |
| *F01D 11/00* | (2006.01) |
| *F01D 11/08* | (2006.01) |
| *F16J 15/44* | (2006.01) |

(52) U.S. Cl.
CPC ............ *F01D 11/003* (2013.01); *F01D 11/08* (2013.01); *F16J 15/44* (2013.01)

(58) Field of Classification Search
CPC .......... F01D 11/003; F01D 11/08; F16J 15/44
See application file for complete search history.

(56) References Cited

U.S. PATENT DOCUMENTS

| | | |
|---|---|---|
| 1,187,212 A | 6/1916 | Westinghouse |
| 3,594,010 A | 7/1971 | Warth |
| 3,847,403 A | 11/1974 | Thiesler et al. |
| 4,017,088 A | 4/1977 | Lerjen |
| 4,213,656 A | 7/1980 | Olschewski et al. |
| 4,428,587 A | 1/1984 | Forch |
| 4,998,739 A | 3/1991 | Weiler |
| 5,626,347 A | 5/1997 | Ullah |
| 6,250,640 B1 | 6/2001 | Wolfe et al. |
| 6,338,490 B1 | 1/2002 | Bainachi |

(Continued)

FOREIGN PATENT DOCUMENTS

| | | |
|---|---|---|
| EP | 3009611 A1 | 4/2016 |
| EP | 3009612 A1 | 4/2016 |

(Continued)

OTHER PUBLICATIONS

European Search Report for Application No. EP 19 22 0248.

(Continued)

*Primary Examiner* — Gilbert Y Lee
(74) *Attorney, Agent, or Firm* — Cantor Colburn LLP

(57) ABSTRACT

A hydrostatic seal configured to be disposed between relatively rotatable components. The seal includes a base. The seal also includes a seal housing. The seal further includes a shoe operatively coupled to the base and extending axially from a forward end to an aft end. The seal yet further includes a plurality of teeth extending radially from a sealing surface of the shoe, one of the teeth being a longest tooth that extends furthest radially from the sealing surface, the axial distance from the forward end of the shoe to the longest tooth being greater than a radial distance from a radial tooth tip to the sealing surface.

13 Claims, 3 Drawing Sheets

(56) References Cited

U.S. PATENT DOCUMENTS

| | | |
|---|---|---|
| 6,669,443 B2 | 12/2003 | Burnett et al. |
| 7,410,173 B2 | 8/2008 | Justak |
| 7,896,352 B2 | 3/2011 | Justak |
| 8,002,285 B2 | 8/2011 | Justak |
| 8,172,232 B2 | 5/2012 | Justak |
| 8,474,827 B2 | 7/2013 | Grondahl |
| 8,600,707 B1 | 12/2013 | El-Aini et al. |
| 8,641,045 B2 | 2/2014 | Justak |
| 8,919,781 B2 | 12/2014 | Justak |
| 9,045,994 B2 | 6/2015 | Bidkar et al. |
| 9,115,810 B2 | 8/2015 | Bidkar et al. |
| 9,255,642 B2 | 2/2016 | Bidkar et al. |
| 9,359,908 B2 | 6/2016 | Bidkar et al. |
| 9,587,746 B2 | 3/2017 | Bidkar et al. |
| 9,988,921 B2 | 6/2018 | Wilson et al. |
| 10,030,531 B2 | 7/2018 | Peters |
| 10,094,232 B2 | 10/2018 | Mccaffrey et al. |
| 10,208,615 B2 | 2/2019 | Peters |
| 2003/0080513 A1 | 5/2003 | Kirby, III et al. |
| 2005/0200080 A1 | 9/2005 | Baghdadi et al. |
| 2008/0122183 A1 | 5/2008 | Braun et al. |
| 2008/0265513 A1* | 10/2008 | Justak ............... F01D 11/025 277/301 |
| 2013/0234399 A1* | 9/2013 | Justak ............... F16J 15/44 277/411 |
| 2013/0241153 A1 | 9/2013 | Garrison |
| 2014/0008871 A1 | 1/2014 | Bidkar et al. |
| 2014/0062024 A1 | 3/2014 | Bidkar et al. |
| 2014/0117624 A1* | 5/2014 | Bidkar ............... F16J 15/447 277/350 |
| 2014/0119912 A1* | 5/2014 | Bidkar ............... F16J 15/442 415/229 |
| 2015/0159498 A1 | 6/2015 | Mukhopadhyay et al. |
| 2016/0097294 A1 | 4/2016 | Wilson et al. |
| 2016/0108750 A1 | 4/2016 | Wilson et al. |
| 2016/0109025 A1 | 4/2016 | Mccaffrey et al. |
| 2016/0115804 A1 | 4/2016 | Wilson et al. |
| 2017/0248236 A1 | 8/2017 | Simpson et al. |
| 2017/0306780 A1 | 10/2017 | Peters et al. |
| 2018/0058240 A1 | 3/2018 | Chuong et al. |
| 2020/0217215 A1 | 7/2020 | Grover et al. |
| 2020/0217420 A1 | 7/2020 | Hilbert et al. |
| 2020/0217421 A1 | 7/2020 | Hilbert et al. |
| 2020/0217422 A1 | 7/2020 | Grover et al. |

FOREIGN PATENT DOCUMENTS

| | | |
|---|---|---|
| EP | 2580498 B1 | 8/2016 |
| EP | 3290756 A1 | 3/2018 |
| WO | 0155624 A1 | 8/2001 |
| WO | 2014022290 A1 | 2/2014 |
| WO | 2015147967 A1 | 10/2015 |

OTHER PUBLICATIONS

European Search Report Application No. 19220241.4; dated Jun. 17, 2020.
European Search Report for Application No. EP 19 21 9629.
European Search Report for Application No. EP 19 21 9634; dated May 26, 2020.
European Search Report Application No. EP 19 21 9645; dated Jun. 4, 2020.
U.S. Non-Final Office Action dated May 14, 2020 for U.S. Appl. No. 16/239,231.
U.S. Non Final Office Action dated May 29, 2020 for U.S. Appl. No. 16/239,242.
U.S. Non Final Office Action dated May 15, 2020 for U.S. Appl. No. 16/239,611.
U.S. Non Final Office Action dated May 29, 2020 for U.S. Appl. No. 16/239,226.

\* cited by examiner

HYDROSTATIC SEAL WITH AFT TOOTH

BACKGROUND

Exemplary embodiments pertain to the art of gas turbine engines and, more particularly, to a hydrostatic seal having an aft tooth.

Hydrostatic seals exhibit less leakage compared to traditional knife edge seals while exhibiting a longer life than brush seals. Some hydrostatic seals may be used between a stator and a rotor within a gas turbine engine. The hydrostatic seal is mounted to the stator to maintain a desired gap dimension between the hydrostatic seal and the rotor. The hydrostatic seal has the ability to 'track' the relative movement between the stator and the rotor throughout the engine operating profile when a pressure differential is developed across the seal.

Hydrostatic seals involve motion of a spring-attached shoe whose response is based on aerodynamic forces developed between the seal shoe and a rotor surface during operation. When properly designed, the hydrostatic seal will maintain tight clearances across the operating range of the engine. At tight clearances, the flow under the seal shoe acts as a high-speed jet whose behavior can exhibit variability that can result in negative performance of the seal. In addition, for seals of longer axial length, the pressure variations downstream of the primary pack of seal teeth can result in undesirable aero-mechanical properties of the seal for a given mode.

BRIEF DESCRIPTION

Disclosed is a hydrostatic seal configured to be disposed between relatively rotatable components. The seal includes a base. The seal also includes a seal housing. The seal further includes a shoe operatively coupled to the base and extending axially from a forward end to an aft end. The seal yet further includes a plurality of teeth extending radially from a sealing surface of the shoe, one of the teeth being a longest tooth that extends furthest radially from the sealing surface, the axial distance from the forward end of the shoe to the longest tooth being greater than a radial distance from a radial tooth tip to the sealing surface.

In addition to one or more of the features described above, or as an alternative, further embodiments may include that the aft tooth is located at the aft end of the shoe.

In addition to one or more of the features described above, or as an alternative, further embodiments may include that the plurality of teeth includes a cluster of teeth and the aft tooth, each of the cluster of teeth located closer to the forward end than to the aft end of the shoe.

In addition to one or more of the features described above, or as an alternative, further embodiments may include that the aft tooth is axially spaced from the cluster of teeth, the axial spacing of the aft tooth from the cluster of teeth being greater than 50% of the axial length of a sealing surface of the shoe.

In addition to one or more of the features described above, or as an alternative, further embodiments may include a beam operatively coupling the shoe to the base.

In addition to one or more of the features described above, or as an alternative, further embodiments may include that the beam is one of a plurality of beams oriented parallel to each other.

Also disclosed is a seal assembly disposed in a gas turbine engine. The seal assembly includes a first component. The seal assembly also includes a second component, the first component and the second component relatively rotatable components. The seal assembly further includes a first hydrostatic seal disposed between the first component and the second component. The seal includes a base. The seal also includes a shoe operatively coupled to the base and extending axially from a forward end to an aft end to define an axial length. The seal further includes a plurality of teeth extending radially from a sealing surface of the shoe, one of the teeth being an aft tooth located closer to the aft end than to the forward end of the shoe.

In addition to one or more of the features described above, or as an alternative, further embodiments may include that the aft tooth is located at the aft end of the shoe.

In addition to one or more of the features described above, or as an alternative, further embodiments may include that the plurality of teeth includes a cluster of teeth and the aft tooth, each of the cluster of teeth located closer to the forward end than to the aft end of the shoe.

In addition to one or more of the features described above, or as an alternative, further embodiments may include that the aft tooth is axially spaced from the cluster of teeth, the axial spacing of the aft tooth from the cluster of teeth being greater than 50% of the axial length of a sealing surface of the shoe.

In addition to one or more of the features described above, or as an alternative, further embodiments may include a beam operatively coupling the shoe to the base.

In addition to one or more of the features described above, or as an alternative, further embodiments may include that the beam is one of a plurality of beams oriented parallel to each other.

In addition to one or more of the features described above, or as an alternative, further embodiments may include that the first component is a stator and the second component is a rotor.

In addition to one or more of the features described above, or as an alternative, further embodiments may include that the seal is operatively coupled to the stator.

Further disclosed is a gas turbine engine including a compressor section, a combustor section, a turbine section, and a seal assembly disposed in the gas turbine engine, the seal assembly comprising a stator, a rotor, and a first hydrostatic seal disposed between a stator and the rotor. The seal includes a base. The seal also includes a shoe operatively coupled to the base and extending axially from a forward end to an aft end to define an axial length. The seal further includes a plurality of teeth extending radially from a sealing surface of the shoe, one of the teeth being an aft tooth located closer to the aft end than to the forward end of the shoe.

In addition to one or more of the features described above, or as an alternative, further embodiments may include that the aft tooth is located at the aft end of the shoe.

In addition to one or more of the features described above, or as an alternative, further embodiments may include that the plurality of teeth includes a cluster of teeth and the aft tooth, each of the cluster of teeth located closer to the forward end than to the aft end of the shoe.

In addition to one or more of the features described above, or as an alternative, further embodiments may include that the aft tooth is axially spaced from the cluster of teeth, the axial spacing of the aft tooth from the cluster of teeth being greater than 50% of the axial length of a sealing surface of the shoe.

In addition to one or more of the features described above, or as an alternative, further embodiments may include a beam operatively coupling the shoe to the base.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
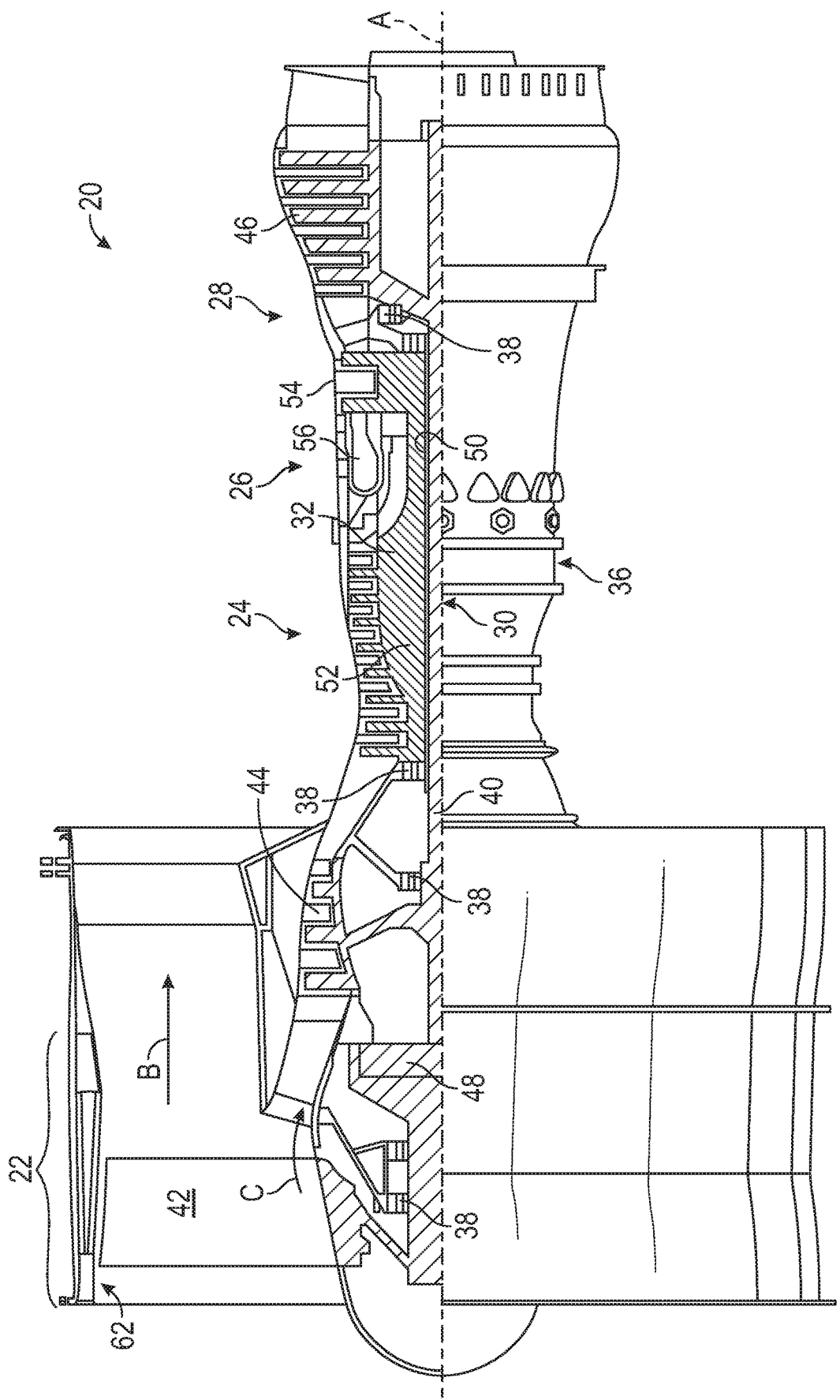
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 m/sec).

Figure 2:
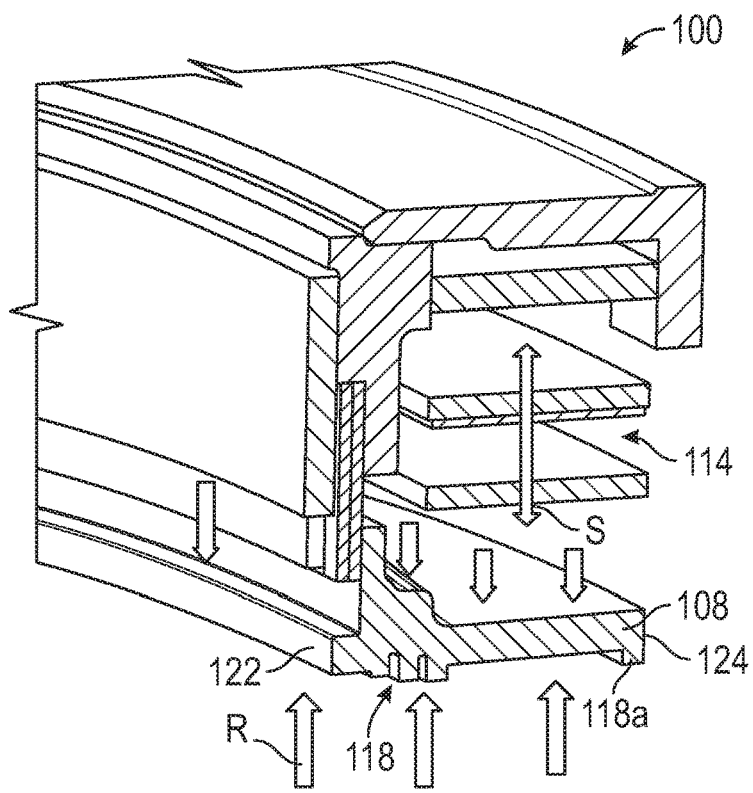
FIG. 2 is a perspective view of a portion of a hydrostatic seal assembly.
Figure 3:
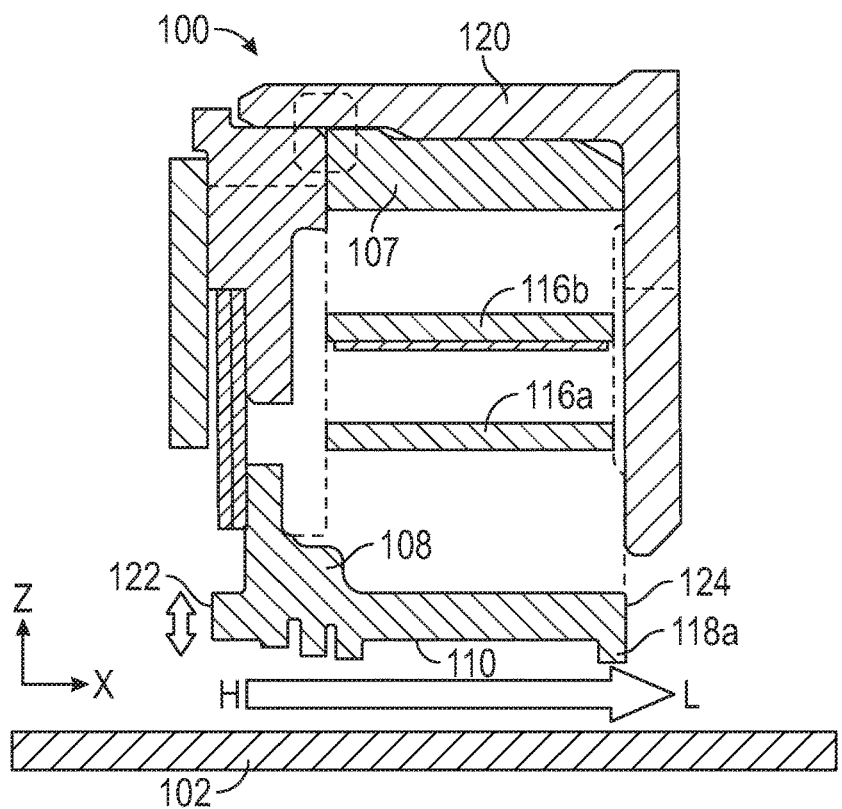
FIG. 3 is cross-sectional view of the hydrostatic seal assembly according to an aspect of the disclosure.

FIGS. 2 and 3 illustrate a hydrostatic seal indicated generally at 100. The hydrostatic seal 100 is intended to create a seal between two relatively rotating components, such as a fixed stator and a rotating rotor 102. The hydrostatic seal 100 includes a base portion 107 and at least one, but often a plurality of circumferentially adjacent shoes 108 which are located in a non-contact position along the exterior surface of the rotor 102. Each shoe 108 is formed with a sealing surface 110. For purposes of the present disclosure, the term "axial" or "axially spaced" refers to a direction along the rotational axis of the rotor, whereas "radial" refers to a direction perpendicular to the rotational axis of the rotor. FIG. 3 illustrates axial direction X and radial direction Z.

Under some operating conditions, it is desirable to limit the extent of radial movement of the shoes 108 with respect to the rotor 102 to maintain tolerances, such as the spacing between the shoes 108 and the facing surface of the rotor.

The hydrostatic seal 100 includes at least one spring element 114. In the current embodiment, each spring element 114 is formed with at least one beam though in practice other elements could be utilized to create the spring element. In the illustrated embodiment, two beams are shown, specifically an inner beam 116a and an outer beam 116b. The beams 116a, 116b connect the shoe 108 to the base portion 107 of the seal 100. The base portion 107 is fixed to a carrier 120 that is part of a static structure.

Particularly when the hydrostatic seal 100 is used in applications such as gas turbine engines, pressures are developed which apply an aerodynamic forces to the shoe 108, which is counter-balanced by the spring 114, causing it to move radially with respect to the rotor 102. The initial assembly point has a defined radial gap between the shoe 108 and the rotating surface, with no aerodynamic forces acting upon the shoe 108. In operation, the hydrostatic seal 100 is used to restrict flow between a high pressure region H and a lower pressure region L. To assist with the flow restriction, a plurality of teeth 118 are included on the sealing surface 110 of the shoe 108. The pressure drop across the shoe 108 results in a radial force R on the shoe 108 which is counter balanced by the spring 114 with spring force S. In operation, when the air flow between the shoe 108 and rotor 102 increases, the pressures on the shoe 108 generally decrease. The reduction in pressures along the shoe 108 reduces the radial force acting on the shoe 108 such that the force balance between the overall aerodynamic forces on the seal shoe and the spring force S causes the shoe 108 to be pushed radially inwardly toward the rotor 102, thus decreasing the gap, until the seal reaches an equilibrium position considering the spring force of the displaced beam(s). Conversely, in operation, when the air flow between the shoe 108 and rotor 102 decreases, the pressures on the shoe 108 generally increase. The increase of radial force on the shoe 108, and its overall impact with the net aerodynamic forces on the seal shoe 108 considering the spring force S, causes the shoe 108 to move radially outwardly from the rotor 102 until the seal reaches an equilibrium position considering the spring force of the displaced beam(s).

Energy from adjacent mechanical or aerodynamic excitation sources (e.g. rotor imbalance, flow through the seal, other sections of the engine, etc.) may be transmitted to the seal 100, potentially creating a vibratory response in the seal 100. For a seal with undesirable aero-mechanical properties, the vibratory response of the shoes 108 at their natural frequencies can be self-reinforcing, causing unwanted vibration levels and possible deflection of the shoes 108. Such vibratory responses create vibratory stress leading to possible reduced life of the seal 100, and can be large enough to cause unintended deflections of the shoes 108.

As shown in FIGS. 2-5, the sealing surface 110 of the shoe 108 includes the plurality of teeth 118 projecting therefrom. In typical tooth configurations, a cluster of teeth are positioned together proximate a forward end 122 of the shoe 108. The shoe 108 extends axially from the forward end 122 to an aft end 124 to define an axial length of the shoe 108. In the typical tooth configurations—with all teeth located proximate the forward axial half of the shoe 108—the radial space between the rotor 102 and the sealing surface 110 of the shoe 108 operates as what may be characterized as a diffuser at an axial space defined by the most aft tooth of the teeth cluster and the exit area of the flow. The geometry of the diffuser changes as the seal gap changes from a build clearance to a smaller running clearance. On a diffuser map, this can result in diffuser aerodynamic flow changing from relatively stable fluid dynamics to maximum aerodynamic unsteadiness.

In the embodiments disclosed herein, one or more teeth are positioned in the conventional forward location, but an aft tooth 118a is also provided to be located proximate the aft end 124 of the shoe 108 to stabilize the flow between the rotor 102 and the shoe 108 by improving the seal pressure characteristics on the downstream portion of the shoe 108. The aft tooth 118a is the tooth of the plurality of teeth 118 located axially closest to the aft end 124 of the shoe 108. Although each of the illustrated embodiments depict the aft tooth 118a being located precisely at the aft end 124 of the shoe 108, it is to be understood that the location of the aft tooth 118a "proximate the aft end 124" is defined by locations at the aft end 124 in some embodiments and spaced axially forward from the aft end 124 in other embodiments. For embodiments with the aft tooth 118a spaced axially forward from the aft end 124, the aft tooth 118a must be axially located at an axially aft half of the shoe 108. Specifically, the axial length mid-point of the shoe 108 is located at an axial location that is 50% of the axial length of the shoe 108. The aft tooth 118a is located axially rearward of the axial length mid-point. In other words, the aft tooth 118a is located closer to the aft end 124 of the shoe 108 than to the forward end 122 of the shoe 108.

Figure 4:
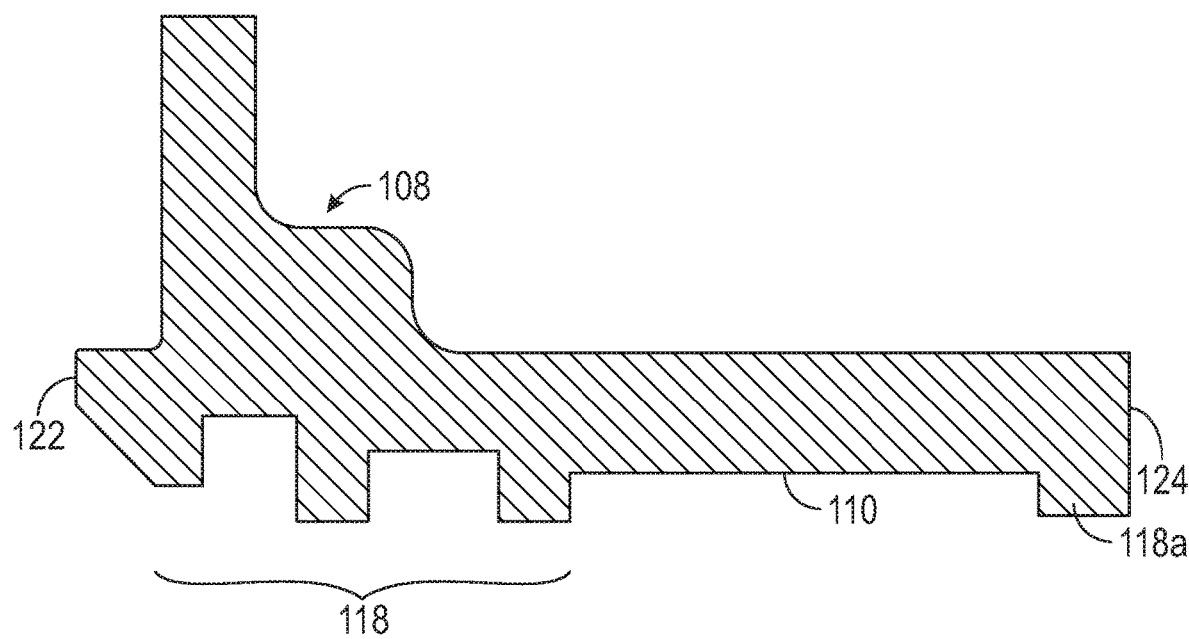
FIG. 4 is a cross-sectional view of a shoe of the hydrostatic seal according to an aspect of the disclosure.
Figure 5:
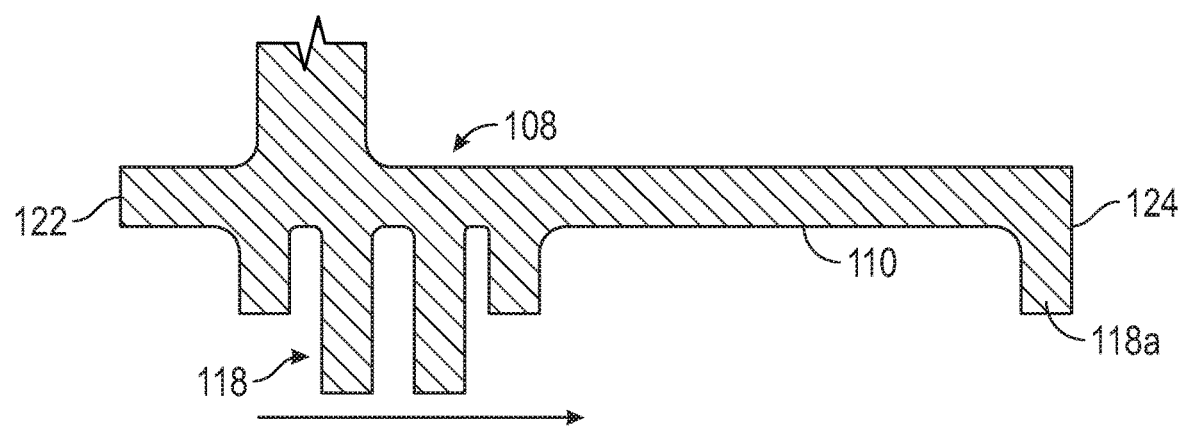
FIG. 5 is a cross-sectional view of the shoe of the hydrostatic seal according to an aspect of the disclosure.

As shown in FIGS. 4 and 5, the number of teeth considered to be part of the forward cluster of teeth referred to with numeral 118 may vary. Additionally, the radial lengths of the teeth and axial spacing therebetween may vary depending upon the particular application. Regardless of the number, dimensions and geometric orientation of the teeth 118, the above-described aft tooth 118a is axially spaced downstream therefrom to effectively eliminate the diffuser characteristics that are present with prior seal designs. The axial spacing of the aft tooth 118a from the cluster of teeth 118 is greater than 50% of the axial length of the sealing surface 110 of the shoe 108. The lifting force balance is changed as the controlling area moves to rear of the seal shoe 108, but large scale dynamic unsteadiness under the shoe 108 is reduced or eliminated.

The embodiments described herein improve the sealing performance robustness of the seal 100 via improved damping characteristics and flow jet stabilization at certain conditions.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic seal configured to be disposed between relatively rotatable components, the seal comprising:
   a base;
   a shoe operatively coupled to the base and extending axially from a forward end to an aft end to define an axial length; and
   a cluster of teeth and an aft tooth extending radially from a sealing surface of the shoe, the cluster of teeth being located proximate to the forward end of the shoe and the aft tooth being located proximate to an aft end of the shoe, wherein the aft tooth is axially spaced from the cluster of teeth such that an axial spacing of the aft tooth from the cluster of teeth is greater than 50% of the axial length of the sealing surface of the shoe.

2. The seal of claim 1, wherein the aft tooth is located at the aft end of the shoe.

3. The seal of claim 1, further comprising a beam operatively coupling the shoe to the base.

4. The seal of claim 3, wherein the beam is one of a plurality of beams oriented parallel to each other.

5. A seal assembly disposed in a gas turbine engine, the seal assembly comprising:
   a first component;
   a second component, the first component and the second component relatively rotatable components; and
   a first hydrostatic seal disposed between the first component and the second component, the seal comprising:
      a base;
      a shoe operatively coupled to the base and extending axially from a forward end to an aft end to define an axial length; and
      a cluster of teeth and an aft tooth extending radially from a sealing surface of the shoe, the cluster of teeth being located proximate to the forward end of the shoe and the aft tooth being located proximate to an aft end of the shoe, wherein the aft tooth is axially spaced from the cluster of teeth such that an axial spacing of the aft tooth from the cluster of teeth is greater than 50% of the axial length of the sealing surface of the shoe.

6. The seal assembly of claim 5, wherein the aft tooth is located at the aft end of the shoe.

7. The seal assembly of claim 5, further comprising a beam operatively coupling the shoe to the base.

8. The seal assembly of claim 7, wherein the beam is one of a plurality of beams oriented parallel to each other.

9. The seal assembly of claim 5, wherein the first component is a stator and the second component is a rotor.

10. The seal assembly of claim 9, wherein the seal is operatively coupled to the stator.

11. A gas turbine engine comprising:
    a compressor section;
    a combustor section;
    a turbine section; and
    a seal assembly disposed in the gas turbine engine, the seal assembly comprising a stator, a rotor, and a first hydrostatic seal disposed between a stator and the rotor, the seal comprising:
       a base;
       a shoe operatively coupled to the base and extending axially from a forward end to an aft end to define an axial length; and
       a cluster of teeth and an aft tooth extending radially from a sealing surface of the shoe, the cluster of teeth being located proximate to the forward end of the shoe and the aft tooth being located proximate to an aft end of the shoe, wherein the aft tooth is axially spaced from the cluster of teeth such that an axial spacing of the aft tooth from the cluster of teeth is greater than 50% of the axial length of the sealing surface of the shoe.

12. The gas turbine engine of claim 11, wherein the aft tooth is located at the aft end of the shoe.

13. The gas turbine engine of claim 11, further comprising a beam operatively coupling the shoe to the base.

* * * * *